United States Patent
Okubo et al.

(10) Patent No.: US 11,518,340 B2
(45) Date of Patent: Dec. 6, 2022

(54) WEBBING TAKE-UP DEVICE

(71) Applicant: KABUSHIKI KAISHA TOKAI-RIKA-DENKI-SEISAKUSHO, Aichi (JP)

(72) Inventors: Shinichi Okubo, Aichi (JP); Ryu Nakajima, Aichi (JP); Masanori Nagamine, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 193 days.

(21) Appl. No.: 16/968,262

(22) PCT Filed: Jan. 29, 2019

(86) PCT No.: PCT/JP2019/003007
§ 371 (c)(1),
(2) Date: Aug. 7, 2020

(87) PCT Pub. No.: WO2019/159686
PCT Pub. Date: Aug. 22, 2019

(65) Prior Publication Data
US 2021/0031722 A1    Feb. 4, 2021

(30) Foreign Application Priority Data
Feb. 16, 2018 (JP) .............................. JP2018-025790

(51) Int. Cl.
*B60R 22/28*    (2006.01)
*B60R 22/405*    (2006.01)

(52) U.S. Cl.
CPC ................... *B60R 22/405* (2013.01)

(58) Field of Classification Search
CPC ... B60R 22/28; B60R 22/405; B60R 22/3413; B60R 2022/287
See application file for complete search history.

(56) References Cited

U.S. PATENT DOCUMENTS

| | | | |
|---|---|---|---|
| 7,410,113 B2 * | 8/2008 | Keller | B60R 22/3413 242/382.5 |
| 9,688,237 B2 * | 6/2017 | Ijiri | B60R 22/405 |
| 2002/0038834 A1 | 4/2002 | Mishina et al. | |
| 2015/0108263 A1 | 4/2015 | Suminaka et al. | |

FOREIGN PATENT DOCUMENTS

| | | |
|---|---|---|
| JP | 08-121120 A | 5/1996 |
| JP | 2002-104134 A | 4/2002 |
| JP | 2013-244885 A | 12/2013 |

* cited by examiner

*Primary Examiner* — Sang K Kim
(74) *Attorney, Agent, or Firm* — Calderon Safran & Cole P.C.

(57) ABSTRACT

In a webbing take-up device, side faces of press-fit holes in a pinion are inclined in directions toward the outside of the press-fit holes on progression toward the right. Press-fit portions of a torsion shaft are press-fit into the press-fit holes from the right such that an interference force between the press-fit portions and the side faces of the press-fit holes increases on progression toward the left. This enables the press-fit portions to be effectively retained in the press-fit holes.

6 Claims, 7 Drawing Sheets

WEBBING TAKE-UP DEVICE

CROSS-REFERENCE TO RELATED APPLICATIONS

The present application is a U.S. National Phase of PCT/JP2019/003007 filed on Jan. 29, 2019, claiming priority under 35 USC 119 from Japanese Patent Application No. 2018-025790 filed Feb. 16, 2018, the disclosure of which is incorporated by reference herein.

TECHNICAL FIELD

The present invention relates to a webbing take-up device in which a rotation body and a linking body are linked together so as to be capable of rotating integrally with one another, and the linking body and a restricting body are linked together so as to be capable of rotating integrally with one another.

BACKGROUND ART

In a seatbelt retractor disclosed in Japanese Patent Application Laid-Open (JP-A) No. 2002-104134, rattle-suppressing ribs are provided at peripheral faces of axial direction holes in a reel and a locking base. A first torque transmission shaft and a second torque transmission shaft of a torsion shaft are press-fit into the respective axial direction holes, such that the reel, the locking base, and the torsion shaft are capable of rotating integrally with one another.

It is preferable that the first torque transmission shaft or the second torque transmission shaft can be effectively retained in the axial direction hole of such seatbelt retractors.

SUMMARY OF INVENTION

Technical Problem

In consideration of the above circumstances, an object of the present invention is to obtain a webbing take-up device capable of effectively retaining a press-fit portion in a press-fit hole.

Solution to Problem

A webbing take-up device of a first aspect of the present invention includes a rotation body that is rotated in a pull-out direction when webbing for fitting over an occupant is pulled out, a linking body that is linked to the rotation body so as to be capable of rotating integrally with the rotation body, a restricting body that is linked to the linking body so as to be capable of rotating integrally with the linking body, and that is restricted from rotating in the pull-out direction at a predetermined occasion, and a press-fit portion that is provided at one of the linking body or either the rotation body or the restricting body, that is press-fit into a press-fit hole provided at another of the linking body or either the rotation body or the restricting body so as to link the linking body and either the rotation body or the restricting body together, and that is configured such that an interference force between the press-fit portion and the press-fit hole increases on progression along a press-fit direction into the press-fit hole.

A webbing take-up device of a second aspect of the present invention includes a rotation body that is rotated in a pull-out direction when webbing for fitting over an occupant is pulled out, a linking body that is linked to the rotation body so as to be capable of rotating integrally with the rotation body, a restricting body that is linked to the linking body so as to be capable of rotating integrally with the linking body, and that is restricted from rotating in the pull-out direction at a predetermined occasion, a press-fit portion that is provided at one of the linking body or either the rotation body or the restricting body, and that is press-fit into a press-fit hole provided at another of the linking body or either the rotation body or the restricting body so as to link the linking body and either the rotation body or the restricting body together, and a carved location that is provided at a peripheral face of at least one of the press-fit hole or the press-fit portion, that is disposed on a side where rotational force of the rotation body is applied when the restricting body is restricted from rotating in the pull-out direction, and that is formed by press-fitting the press-fit portion into the press-fit hole.

A webbing take-up device of a third aspect of the present invention includes a rotation body that is rotated in a pull-out direction when webbing for fitting over an occupant is pulled out, a linking body that is linked to the rotation body so as to be capable of rotating integrally with the rotation body, a restricting body that is linked to the linking body so as to be capable of rotating integrally with the linking body, and that is restricted from rotating in the pull-out direction at a predetermined occasion, and a press-fit portion that is provided at one of the linking body or either the rotation body or the restricting body, and that is press-fit into a press-fit hole provided at another of the linking body or either the rotation body or the restricting body over an entire rotation-axial direction range of the press-fit hole or is press-fit into the press-fit hole over an entire rotation-axial direction range of the press-fit portion so as to link the linking body and either the rotation body or the restricting body together.

A webbing take-up device of a fourth aspect of the present invention is the webbing take-up device of any one of the first aspect to the third aspect of the present invention, further including an assisting portion configured to assist the press-fitting of the press-fit portion into the press-fit hole.

Advantageous Effects of Invention

In the webbing take-up device of the first aspect of the present invention, the rotation body is rotated in the pull-out direction when the webbing for fitting over an occupant is pulled out. Moreover, the rotation body and the linking body are linked so as to be capable of rotating integrally with each other, and the linking body and the restricting body are linked so as to be capable of rotating integrally with each other. Rotation of the restricting body in the pull-out direction is restricted at the predetermined occasion. Furthermore, the press-fit portion of the one of the linking body or either the rotation body or the restricting body is press-fit into the press-fit hole of the other of the linking body or either the rotation body or the restricting body so as to link the linking body and either the rotation body or the restricting body together.

The interference force between the press-fit portion and the press-fit hole increases on progression along the press-fit direction of the press-fit portion into the press-fit hole. This enables the press-fit portion to be effectively retained in the press-fit hole.

In the webbing take-up device of the second aspect of the present invention, the rotation body is rotated in the pull-out direction when the webbing for fitting over an occupant is pulled out. Moreover, the rotation body and the linking body are linked so as to be capable of rotating integrally with each other, and the linking body and the restricting body are linked so as to be capable of rotating integrally with each other. Rotation of the restricting body in the pull-out direction is restricted at the predetermined occasion. Furthermore, the press-fit portion of the one of the linking body or either the rotation body or the restricting body is press-fit into the press-fit hole of the other of the linking body or either the rotation body or the restricting body so as to link the linking body and either the rotation body or the restricting body together.

The carved location is provided at the peripheral face of at least one of the press-fit hole or the press-fit portion by the press-fitting of the press-fit portion into the press-fit hole, such that the carved location is disposed on the side where rotational force of the rotation body is applied when the restricting body is restricted from rotating in the pull-out direction. This enables the press-fit portion to be effectively retained in the press-fit hole by the carved location.

In the webbing take-up device of the third aspect of the present invention, the rotation body is rotated in the pull-out direction when the webbing for fitting over an occupant is pulled out. Moreover, the rotation body and the linking body are linked so as to be capable of rotating integrally with each other, and the linking body and the restricting body are linked so as to be capable of rotating integrally with each other. Rotation of the restricting body in the pull-out direction is restricted at the predetermined occasion. Furthermore, the press-fit portion of the one of the linking body or either the rotation body or the restricting body is press-fit into the press-fit hole of the other of the linking body or either the rotation body or the restricting body so as to link the linking body and either the rotation body or the restricting body together.

The press-fit portion is press-fit into the press-fit hole over the entire rotation-axial direction range of the press-fit hole, or the press-fit portion is press-fit into the press-fit hole over the entire rotation-axial direction range of the press-fit portion. This enables the press-fit portion to be effectively retained in the press-fit hole.

In the webbing take-up device of the fourth aspect of the present invention, the assisting portion assists the press-fitting of the press-fit portion into the press-fit hole. This enables the press-fitting of the press-fit portion into the press-fit hole to be facilitated.

DESCRIPTION OF EMBODIMENTS

Figure 1:
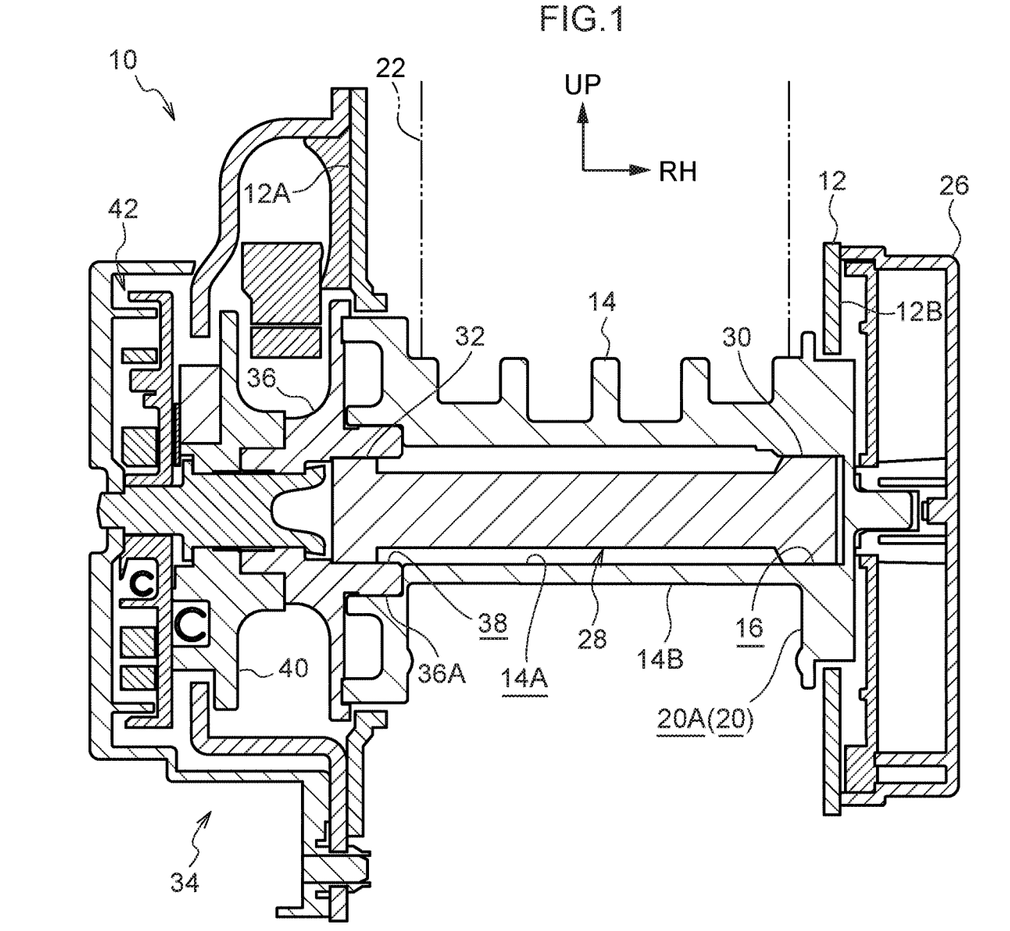
FIG. 1 is a cross-section illustrating a webbing take-up device according to an exemplary embodiment of the present invention, as viewed from the rear.

FIG. 1 is a cross-section illustrating a webbing take-up device 10 according to an exemplary embodiment of the present invention, as viewed from the rear. Note that in the drawings, the arrow RH indicates the right of the webbing take-up device 10, and the arrow UP indicates an upper side of the webbing take-up device 10.

The webbing take-up device 10 according to the present exemplary embodiment is installed in a vehicle such that front, left, and upper sides of the webbing take-up device 10 respectively correspond to for example a vehicle width direction outside, a vehicle front side, and a vehicle upper side.

As illustrated in FIG. 1, the webbing take-up device 10 includes a metal, plate shaped frame 12 with a U-shaped cross-section, serving as a support body. The frame 12 is provided with a back plate (not illustrated in the drawings) on the rear side, a leg plate 12A on the left side, and a leg plate 12B on the right side. The webbing take-up device 10 is installed to the vehicle by fixing the back plate of the frame 12 to the vehicle body.

Figure 2:
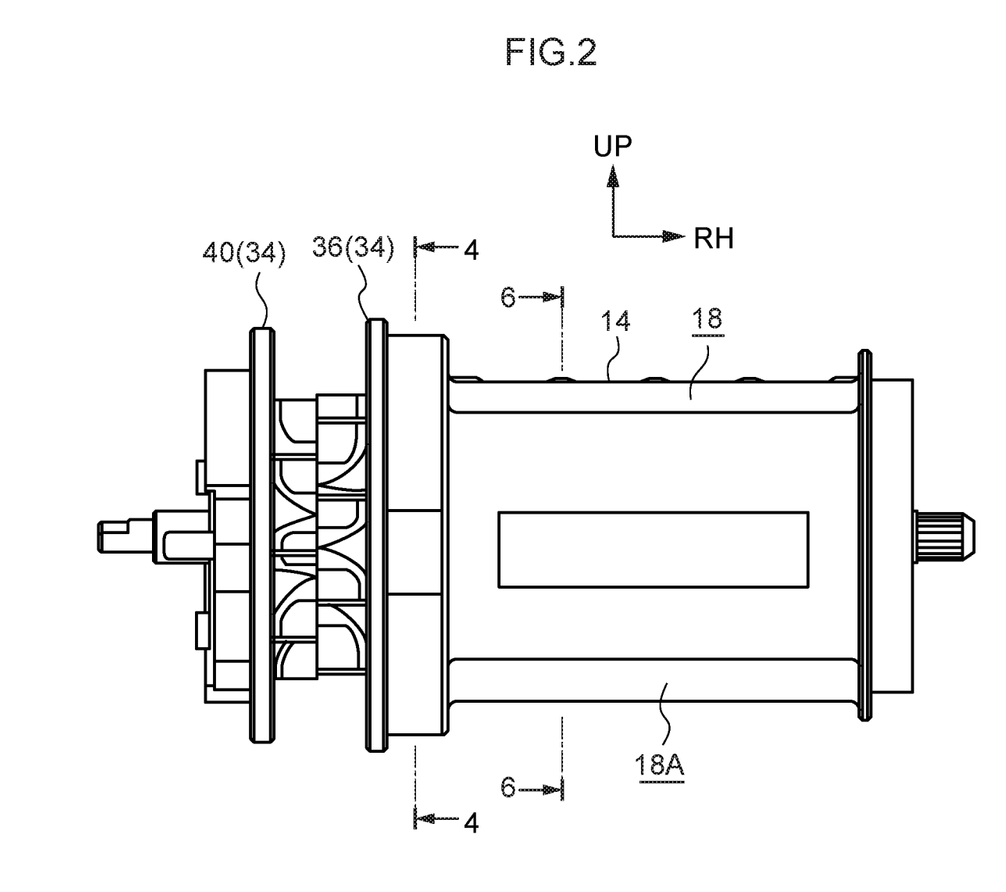
FIG. 2 is a back view illustrating relevant portions of the webbing take-up device according to the exemplary embodiment of the present invention, as viewed from the rear.
Figure 6A:
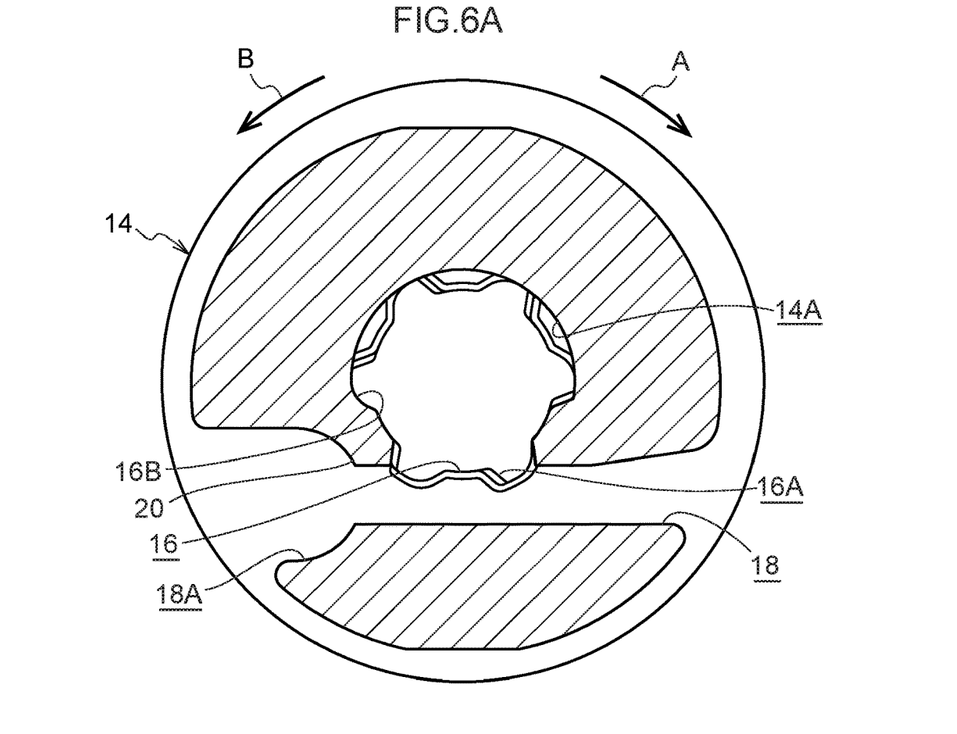
FIG. 6A is a cross-section (sectioned along line 6-6 in FIG. 2) illustrating a linked state of a spool and the torsion shaft of the webbing take-up device according to the exemplary embodiment of the present invention, as viewed from the left.

A spool 14 (see FIG. 2) that is made of metal, that has a bottomed, substantially circular tube shape, and that serves as a rotation body, is supported between the leg plate 12A and the leg plate 12B of the frame 12. The spool 14 is manufactured by die-casting. A left end portion of the spool 14 penetrates the leg plate 12A and a right end portion of the spool 14 penetrates the leg plate 12B, such that the spool 14 is capable of rotating in a take-up direction (the arrow A direction in FIG. 6A, etc.) and a pull-out direction (the arrow B direction in FIG. 6A, etc.). A substantially circular inner hole 14A is coaxially formed inside the spool 14. A left end portion of the inner hole 14A is formed with a coaxially enlarged diameter, and a right face of the spool 14 is blocked off.

A substantially circular first linking hole 16 (see FIG. 6A), serving as a first linked-to portion, is coaxially formed at a right wall of the spool 14 at the inside of the spool 14. The first linking hole 16 is open toward the left side of the spool 14 in an axial direction (left-right direction) of the spool 14 through the inner hole 14A in the spool 14. Plural (six in the present exemplary embodiment) substantially trapezoidal insertion holes 16A are formed at the circumference of the first linking hole 16. The plural insertion holes 16A are disposed at uniform intervals along the circumferential direction of the first linking hole 16. A dimension of each of the insertion holes 16A along the circumferential direction of the first linking hole 16 decreases on progression toward a radial direction outside of the first linking hole 16. Corner faces 16B at the radial direction outside of the first linking hole 16 on the pull-out direction sides of the respective insertion holes 16A have larger internal angles and more gently curving concave profiles than corner faces at the radial direction outside of the first linking hole 16 on the take-up direction side of the respective insertion holes 16A. Side faces on the take-up direction sides of the respective insertion holes 16A have substantially planar profiles, and have smaller angles of inclination with respect to the radial direction of the first linking hole 16 than side faces on the pull-out direction sides of the respective insertion holes 16A.

An elongated rectangular through-hole 18 (see FIG. 2 and FIG. 6A) is formed in a peripheral wall of the spool 14. The through-hole 18 extends along the axial direction of the spool 14. The through-hole 18 penetrates the peripheral wall of the spool 14 in a chord direction, such that the through-hole 18 passes the inner hole 14A portion of the spool 14 and a right side of the through-hole 18 opposes two of the insertion holes 16A of the first linking hole 16. An anchor hole 18A is formed in a base end portion (one penetration direction end portion) of the through-hole 18. The anchor hole 18A widens toward both width direction sides relative to a portion of the through-hole 18 further toward a leading end side (another penetration direction end side) than the anchor hole 18A. Both side faces at a leading end side of the anchor hole 18A (the faces that oppose one another in the width direction) curve in a concave profile, and a leading end side portion of the anchor hole 18A gradually contracts in the width direction on progression toward the leading end side.

A bearing portion 20 (see FIG. 6A) is formed in the peripheral wall of the spool 14 between an anchor hole 18A-side portion of the through-hole 18 and the inner hole 14A in the spool 14. The bearing portion 20 projects in the pull-out direction. An anchor hole 18A-side face at a base end side portion of the bearing portion 20 is formed by the side face at the leading end side of the anchor hole 18A. An anchor hole 18A-side face at a leading end side portion of the bearing portion 20 is formed by a side face of the through-hole 18 further toward the leading end side than the anchor hole 18A. An inner hole 14A-side face of the bearing portion 20 is formed by a peripheral face of the inner hole 14A. An inner hole 14A-side face at the base end side portion of the bearing portion 20 is in the same plane as a peripheral face of a pull-out direction side portion of one of the insertion holes 16A of the first linking hole 16. An inner hole 14A-side face at the leading end side portion of the bearing portion 20 is in the same plane as a peripheral face between the insertion holes 16A of the first linking hole 16.

Figure 6B:
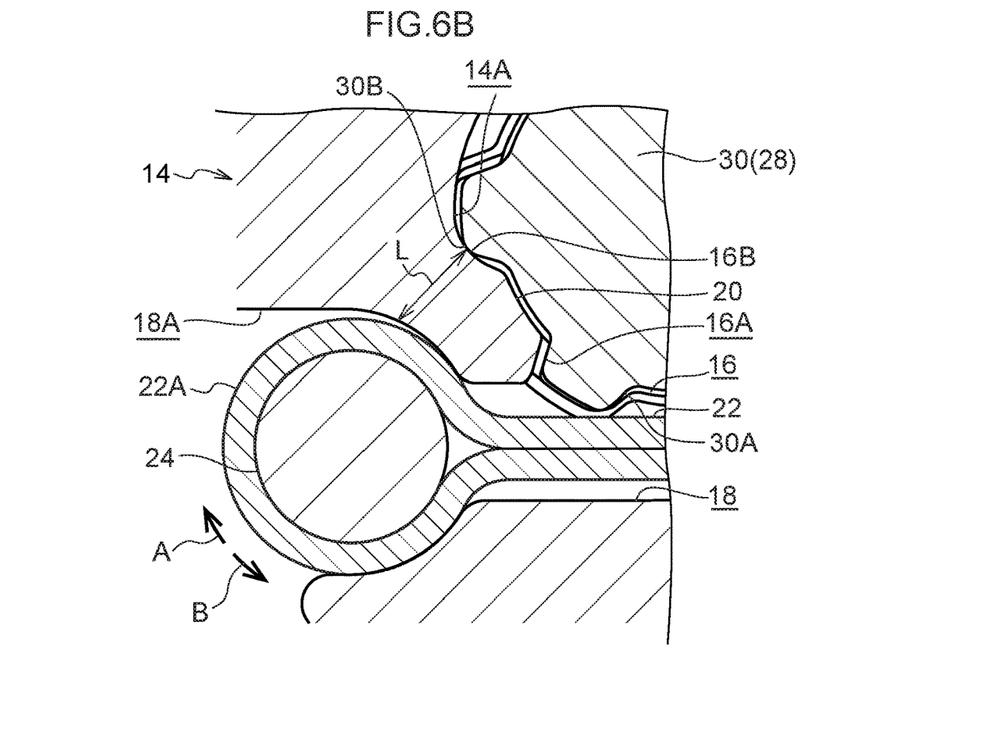
FIG. 6B is an enlarged view of relevant portions of FIG. 6A, illustrating the linked state of the spool and the torsion shaft of the webbing take-up device according to the exemplary embodiment of the present invention.

Elongated belt shaped webbing 22 (see FIG. 6B) is taken onto the spool 14 from a base end side. The base end side of the webbing 22 is inserted into the through-hole 18 in the spool 14 through the leading end side of the through-hole 18. A tube shaped anchor loop 22A is formed at a base end portion of the webbing 22. A circular column shaped metal shaft 24 is inserted through the anchor loop 22A. The anchor loop 22A and the shaft 24 are anchored by the two side faces of the leading end side of the anchor hole 18A in the spool 14, thereby anchoring the base end portion of the webbing 22 to the spool 14. The webbing 22 is taken up onto the spool 14 when the spool 14 is rotated in the take-up direction, whereas the spool 14 is rotated in the pull-out direction when the webbing 22 is pulled out from the spool 14. The webbing 22 is pulled out from the spool 14 to fit the webbing 22 over an occupant seated in a seat of the vehicle.

An urging mechanism 26 is provided on the right side of the frame 12. A flat spiral spring (not illustrated in the drawings), serving as an urging member, is provided in the urging mechanism 26. The flat spiral spring is coupled to the right end portion of the spool 14 and the flat spiral spring urges the spool 14 in the take-up direction.

Figure 3A:
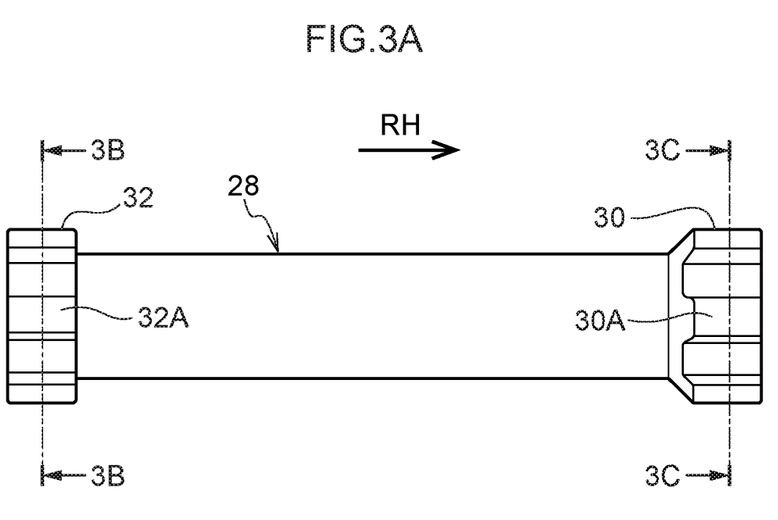
FIG. 3A is a back view illustrating a torsion shaft of the webbing take-up device according to the exemplary embodiment of the present invention, as viewed from the rear.

A substantially circular column shaped metal torsion shaft 28 (see FIG. 3A), serving as a linking body (an energy absorbing member), is coaxially inserted into the inner hole 14A of the spool 14. The torsion shaft 28 is manufactured by forging, and has a greater hardness than the spool 14.

Figure 3B:
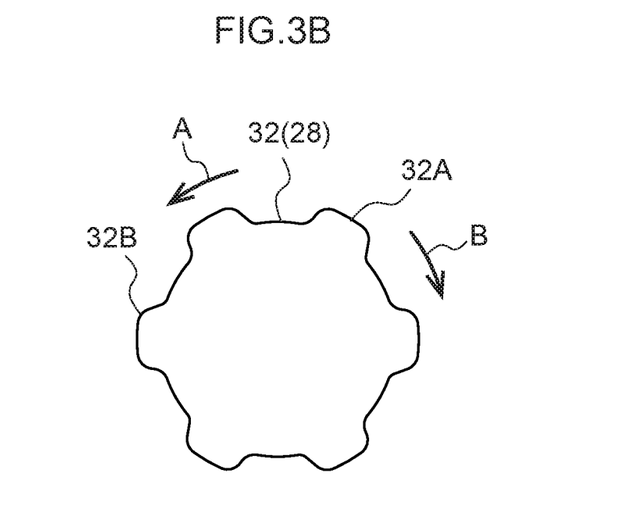
FIG. 3B is a cross-section (sectioned along line 3B-3B in FIG. 3A) illustrating the torsion shaft of the webbing take-up device according to the exemplary embodiment of the present invention, as viewed from the right.
Figure 3C:
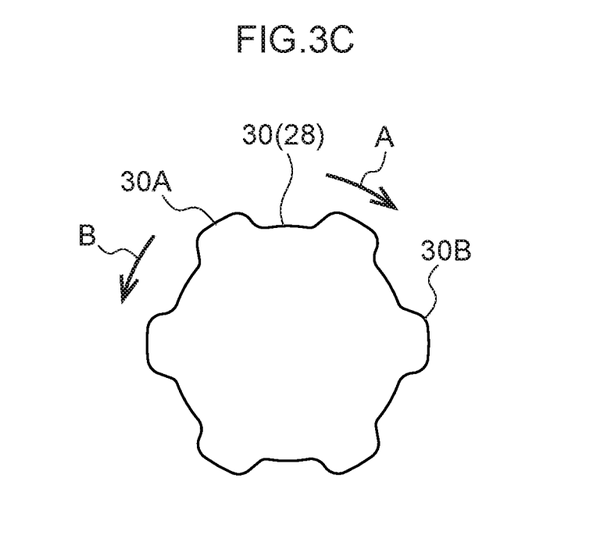
FIG. 3C is a cross-section (sectioned along line 3C-3C in FIG. 3A) illustrating the torsion shaft of the webbing take-up device according to the exemplary embodiment of the present invention, as viewed from the left.

A substantially circular column shaped first linking column 30 (see FIG. 3C), serving as a first linking section, is formed with a coaxially enlarged diameter to a right end portion of the torsion shaft 28. The first linking column 30 is coaxially inserted into the first linking hole 16 in the spool 14 from the left side. Plural (six in the present exemplary embodiment) substantially trapezoidal column shaped insertion portions 30A are formed at the circumference of the first linking column 30. The plural insertion portions 30A are disposed at uniform intervals along the circumferential direction of the first linking column 30. A dimension of each of the insertion portions 30A along the circumferential direction of the first linking column 30 decreases on progression toward the radial direction outside of the first linking column 30. Corner faces 30B between the radial direction outside of the first linking column 30 and the pull-out direction sides of the respective insertion portions 30A have larger internal angles and more gently curving convex profiles than corner faces between the radial direction outside of the first linking column 30 and the take-up direction sides of the insertion portions 30A. Side faces on the take-up direction sides of the respective insertion portions 30A have substantially planar profiles, and have smaller angles of inclination with respect to the radial direction of the first linking column 30 than side faces on the pull-out direction sides of the respective insertion portions 30A.

The insertion portions 30A are inserted into the insertion holes 16A of the first linking hole 16 (see FIG. 6B), such that the side faces on the take-up direction sides of the insertion portions 30A are pressed against (make face-to-face contact with) the side faces on the take-up direction sides of the insertion holes 16A, and the corner faces 30B on the pull-out direction side of the insertion portions 30A are pressed against the corner faces 16B on the pull-out direction side of the insertion holes 16A. Thus, the first linking column 30 (including the insertion portions 30A) is press-fit into the first linking hole 16 (including the insertion holes 16A) in the circumferential direction and the radial direction, thereby linking the torsion shaft 28 to the spool 14 so as to be capable of rotating integrally therewith.

A substantially circular column shaped second linking column 32 (see FIG. 3B), serving as a second linking section, is formed with a coaxially enlarged diameter to a left end portion of the torsion shaft 28. Plural (six in the present exemplary embodiment) substantially trapezoidal column shaped press-fit portions 32A are formed at the circumference of the second linking column 32. The plural press-fit portions 32A are disposed at uniform intervals along the circumferential direction of the second linking column 32. Dimensions of the respective press-fit portions 32A along the circumferential direction of the second linking column 32 decrease on progression toward the radial direction outside of the second linking column 32. Corner faces 32B between the radial direction outside of the second linking column 32 and the pull-out direction sides of the respective press-fit portions 32A have larger internal angles and more gently curving convex profiles than corner faces between the radial direction outside of the second linking column 32 and the take-up direction sides of the respective press-fit portions 32A. Side faces on the take-up direction sides of the respective press-fit portions 32A have substantially planar profiles, and have smaller angles of inclination with respect to the radial direction of the second linking column 32 than side faces on the pull-out direction sides of the respective press-fit portions 32A.

A locking mechanism 34, serving as a restricting mechanism, is provided on the left side of the spool 14.

The locking mechanism 34 is provided with a substantially annular plate shaped metal pinion 36, serving as a coupling member configuring a restricting body. The pinion 36 is manufactured by die-casting, and has a lower hardness than that of the torsion shaft 28. A linking tube 36A with a circular external cross-section profile is coaxially formed to the right side of a central side portion of the pinion 36. The linking tube 36A is coaxially fitted into the left end portion of the inner hole 14A in the spool 14, such that the pinion 36 is disposed coaxially to the spool 14.

Figure 4A:
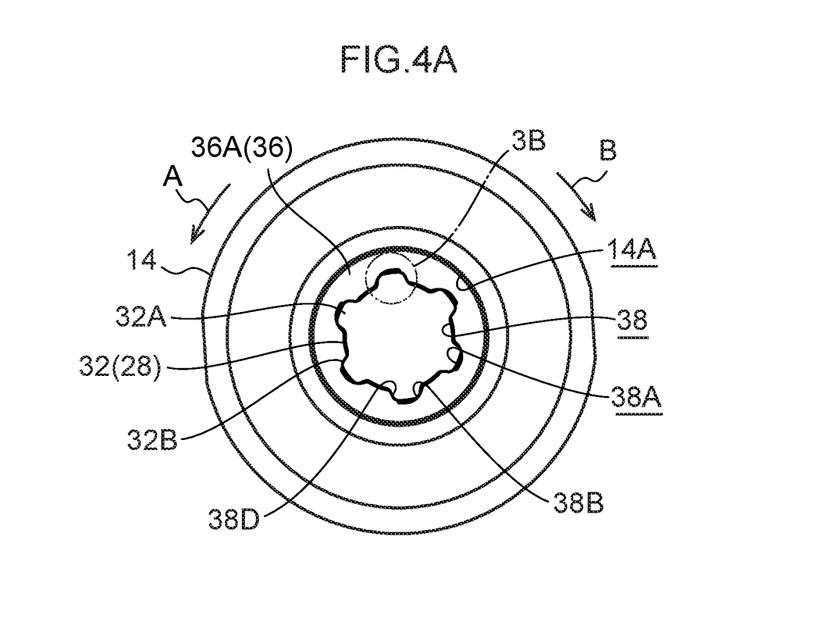
FIG. 4A is a cross-section (sectioned along line 4-4 in FIG. 2) illustrating a linked state of the torsion shaft and a pinion of the webbing take-up device according to the exemplary embodiment of the present invention, as viewed from the right.

A substantially circular column shaped second linking hole 38 (see FIG. 4A and FIG. 4B), serving as a second linked section, is coaxially formed inside the linking tube 36A. The second linking hole 38 is open toward the right side. Plural (six in the present exemplary embodiment) substantially trapezoidal shaped press-fit holes 38A are formed at the circumference of the second linking hole 38. The plural press-fit holes 38A are disposed at uniform intervals along the circumferential direction of the second linking hole 38. Dimensions of the respective press-fit holes 38A along the circumferential direction of the second linking hole 38 decrease on progression toward the radial direction outside of the second linking hole 38. Corner faces 38B between the radial direction outside of the second linking hole 38 and the take-up direction sides of the respective press-fit holes 38A have larger internal angles and more gently curving concave profiles than corner faces between the radial direction outside of the second linking hole 38 and the pull-out direction sides of the respective press-fit holes 38A. Side faces on the pull-out direction sides of the respective press-fit holes 38A have substantially planar profiles, and have smaller angles of inclination with respect to the radial direction of the second linking hole 38 than side faces on the take-up direction sides of the respective press-fit holes 38A.

Figure 5A:
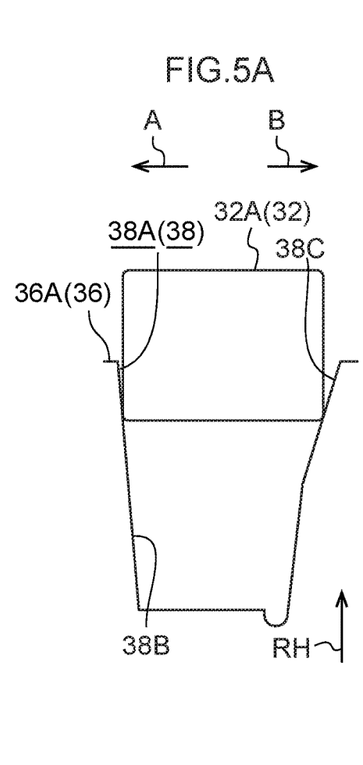
FIG. 5A is a cross-section corresponding to FIG. 4C, illustrating a state prior to linking the torsion shaft and the pinion of the webbing take-up device according to the exemplary embodiment of the present invention.

The side faces of the respective press-fit holes 38A are inclined in directions toward the outside of the press-fit holes 38A on progression toward the right, such that a cross-sectional area of the press-fit hole 38A increases on progression toward the right (see FIG. 5A). This enables a mold used to mold the press-fit holes 38A to be removed from the press-fit holes 38A during molding of the press-fit holes 38A. An assisting face 38C, serving as an assisting portion, is formed to a right side portion of the side face on the pull-out direction side of each of the press-fit holes 38A. The side faces on the pull-out direction sides of the press-fit holes 38A thus have larger angles of incline toward the pull-out direction side at the assisting faces 38C. Thus, dimensions of right ends of the respective press-fit holes 38A along the circumferential direction of the second linking hole 38 are greater than the dimensions of the respective press-fit portions 32A of the torsion shaft 28 along the circumferential direction of the second linking column 32. Moreover, the angle of inclination toward the pull-out direction side of the assisting faces 38C is greater than the angle of inclination toward the take-up direction side of the side faces on the take-up direction sides of the press-fit holes 38A.

Figure 4B:
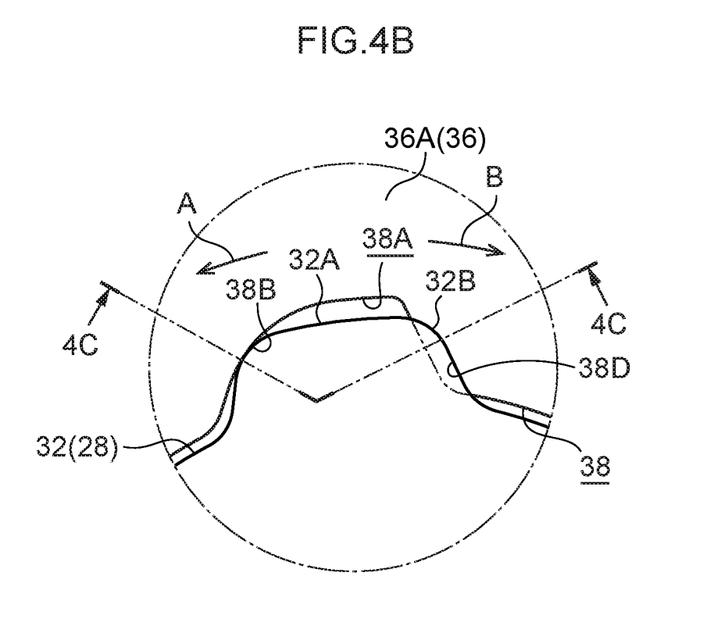
FIG. 4B is an enlarged view of region 3B in FIG. 4A, illustrating the linked state of the torsion shaft and the pinion of the webbing take-up device according to the exemplary embodiment of the present invention.
Figure 4C:
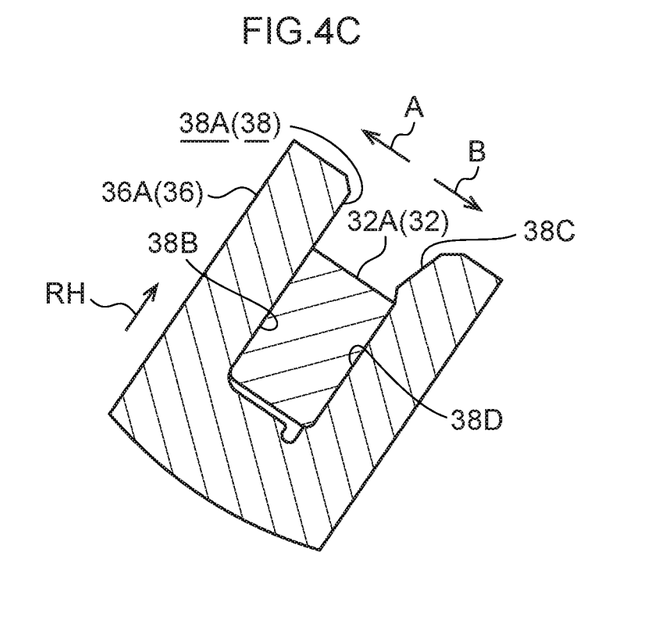
FIG. 4C is a cross-section sectioned along line 4C-4C in FIG. 4B, illustrating the linked state of the torsion shaft and the pinion of the webbing take-up device according to the exemplary embodiment of the present invention.

The entire axial direction range of the second linking column 32 of the torsion shaft 28 (the entire axial direction range of its outer peripheral face) is coaxially inserted into the second linking hole 38 from the right side, and the press-fit portions 32A of the second linking column 32 are inserted into the press-fit holes 38A in the second linking hole 38 (see FIG. 4B and FIG. 4C). The side faces on the pull-out direction sides of the second press-fit portions 32A are pressed against the side faces on the pull-out direction sides of the press-fit holes 38A, and the corner faces on the take-up direction sides of the press-fit portions 32A are pressed against the corner faces 38B on the take-up direction sides of the press-fit holes 38A. Thus, the second linking column 32 (including the press-fit portions 32A) is press-fit into the second linking hole 38 (including the press-fit holes 38A) in the circumferential direction and the radial direction, thereby linking the torsion shaft 28 to the pinion 36 so as to be capable of rotating integrally therewith.

Figure 5B:
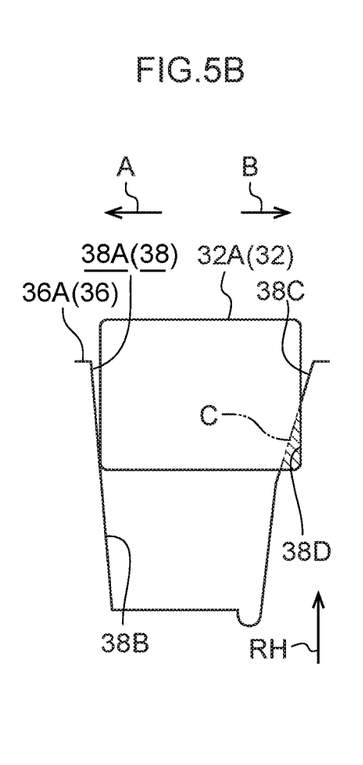
FIG. 5B is a cross-section corresponding to FIG. 4C, illustrating an early stage when linking the torsion shaft and the pinion of the webbing take-up device according to the exemplary embodiment of the present invention.
Figure 5C:
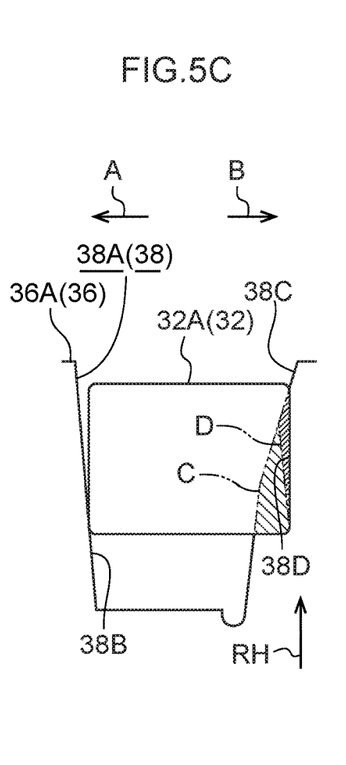
FIG. 5C is a cross-section corresponding to FIG. 4C, illustrating a later stage when linking the torsion shaft and the pinion of the webbing take-up device according to the exemplary embodiment of the present invention.
Figure 5D:
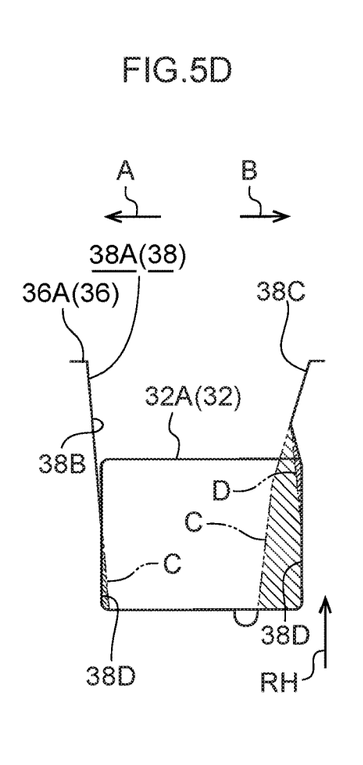
FIG. 5D is a cross-section corresponding to FIG. 4C, illustrating a final linked state of the torsion shaft and the pinion of the webbing take-up device according to the exemplary embodiment of the present invention.

When the second linking column 32 (including the press-fit portions 32A) is being press-fit into the second linking hole 38 (including the press-fit holes 38A), a left face (end face) of each of the press-fit portions 32A abuts the side faces on the pull-out direction side and the take-up direction side of the corresponding press-fit hole 38A at a left-right direction intermediate position of the assisting face 38C (see FIG. 5A). The left face of the press-fit portion 32A then carves into the side faces on the pull-out direction side and the take-up direction side of the press-fit hole 38A so as to enlarge the press-fit hole 38A toward the pull-out direction side and the take-up direction side (see regions C in FIG. 5B to FIG. 5D). Moreover, the press-fit portion 32A is pushed against the side face (hereafter referred to as a carved face 38D) on the pull-out direction side of the press-fit hole 38A by the corner face 38B (inclined face) on the take-up direction side of the press-fit hole 38A, such that the side face on the pull-out direction side of the press-fit portion 32A deforms the side face on the pull-out direction side of the press-fit hole 38A toward the pull-out direction side (a side face formation portion on the pull-out direction side of the press-fit hole 38A is compressed toward the pull-out direction side; see region D in FIG. 5C and FIG. 5D). Thus, portions (including a left side portion of the assisting face 38C) not including a right end portion of the side face on the pull-out direction side of each of the press-fit holes 38A, and a left end portion of the side face on the take-up direction side of the press-fit hole 38A configure the carved face 38D, serving as a carved location.

A substantially circular plate shaped metal lock base 40, serving as a restricting member configuring the restricting body, is coaxially disposed on the left side of the pinion 36. The lock base 40 is coupled to the pinion 36 so as to be capable of rotating integrally therewith.

The locking mechanism 34 is provided with a sensor mechanism 42 on the left side of the lock base 40. The sensor mechanism 42 is activated in the event of a vehicle collision (a predetermined occasion corresponding to a vehicle emergency in which, for example, the vehicle decelerates rapidly and the webbing 22 is abruptly pulled out from the spool 14), whereupon the locking mechanism 34 restricts (locks) rotation of the lock base 40 in the pull-out direction, such that the pinion 36 is restricted from rotating in the pull-out direction, and rotation of the spool 14 in the pull-out direction is limited by the torsion shaft 28.

Next, explanation follows regarding operation of the present exemplary embodiment.

In the webbing take-up device 10 with the above configuration, the webbing 22 is pulled out from the spool 14 in order to fit the webbing 22 over an occupant. Under the urging force of the flat spiral spring of the urging mechanism 26, the spool 14 is rotated in the take-up direction and the webbing 22 is taken up onto the spool 14, thereby eliminating any slack in the webbing 22 fitted over the occupant.

In the event of a vehicle collision, the sensor mechanism 42 of the locking mechanism 34 is activated, whereupon the locking mechanism 34 restricts the lock base 40 from rotating in the pull-out direction, such that the pinion 36 is restricted from rotating in the pull-out direction, and rotation of the spool 14 in the pull-out direction is limited by the torsion shaft 28. Pull-out of the webbing 22 from the spool 14 is thereby limited so as to restrain the occupant with the webbing 22.

In a state in which the lock base 40 and the pinion 36 are restricted from rotating in the pull-out direction, if a load applied by the occupant and acting to pull the webbing 22 out from the spool 14 (a rotational load in the pull-out direction of the spool 14) is equal to or greater than a torsion-withstand load (a force limiter load) of the torsion shaft 28, the torsion shaft 28 undergoes torsional deformation, and the spool 14 is permitted to rotate in the pull-out direction with respect to the lock base 40 and the pinion 36. Thus, kinetic energy of the occupant is absorbed by the torsional deformation of the torsion shaft 28, thus protecting the occupant.

Note that the base end side of the webbing 22 is inserted into the through-hole 18 in the spool 14, that the anchor loop 22A of the webbing 22 and the shaft 24 are anchored to the two side faces of the leading end side of the anchor hole 18A in the through-hole 18, and that the webbing 22 is taken up onto the spool 14 from the base end side. Moreover, the first linking column 30 (including the insertion portions 30A) of the torsion shaft 28 is press-fit into the first linking hole 16 (including the insertion holes 16A) in the spool 14, such that the torsion shaft 28 is linked to the spool 14 so as to be capable of rotating integrally therewith. Furthermore, the second linking column 32 (including the press-fit portions 32A) of the torsion shaft 28 is press-fit into the second linking hole 38 (including the press-fit holes 38A) in the pinion 36, such that the torsion shaft 28 is linked to the pinion 36 so as to be capable of rotating integrally therewith.

Note that the side faces on the pull-out direction sides and the take-up direction sides of the press-fit holes 38A in the pinion 36 are inclined in directions toward the outside of the press-fit holes 38A on progression toward the right side, and the press-fit portions 32A of the torsion shaft 28 are press-fit into the press-fit holes 38A from the right side. Thus, interference force between the press-fit portions 32A and the side faces on the pull-out direction sides and the take-up direction sides of the press-fit holes 38A increases on progression toward the left (in the press-fit direction of the press-fit portions 32A into the press-fit holes 38A). This enables rotation of the press-fit portions 32A in the pull-out direction and the take-up direction with respect to the press-fit holes 38A to be effectively limited, and enables the press-fit portions 32A to be effectively retained by the press-fit holes 38A. Thus, in particular when the pinion 36 is restricted from rotating in the pull-out direction, rotation of the second linking column 32 with respect to the second linking hole 38 can be effectively limited, enabling the torsion shaft 28 to be effectively retained by the pinion 36, and thereby eliminating the need to retain the torsion shaft 28 to the pinion 36 using a separate component.

Furthermore, the carved faces 38D are formed in the side faces on the pull-out direction sides of the press-fit holes 38A by press-fitting the press-fit portions 32A into the press-fit holes 38A. Thus, when the pinion 36 is restricted from rotating in the pull-out direction, pull-out direction rotational force acting in the torsion shaft 28 through the spool 14 is applied to the carved faces 38D by the press-fit portions 32A. As a result of forming the carved faces 38D, the side faces on the pull-out direction sides of the press-fit holes 38A are formed with the same profiles as the side faces on the pull-out direction sides of the corresponding press-fit portions 32A. The carved faces 38D thus enable the press-fit portions 32A to make effective close contact with the side faces on the pull-out direction sides of the press-fit holes 38A. This enables deformation of the side faces on the pull-out direction sides of the press-fit holes 38A by the pull-out direction rotational force in the press-fit portions 32A to be suppressed, and enables the pull-out direction rotational force of the press-fit portions 32A to be effectively borne by the side faces on the pull-out direction sides of the press-fit holes 38A. This enables the press-fit portions 32A to still more effectively retained by the press-fit holes 38A, enabling the torsion shaft 28 to be still more effectively retained by the pinion 36.

Moreover, the entire rotation-axial direction range of the press-fit portions 32A is pressed against the side faces on the pull-out direction sides of the press-fit holes 38A, and the entire rotation-axial direction range of the press-fit portions 32A are press-fit into the press-fit holes 38A. This enables pull-out direction rotation and rotation-radial direction tilting of the press-fit portions 32A with respect to the press-fit holes 38A to be effectively limited, enabling the press-fit portions 32A to be still more effectively retained by the press-fit holes 38A. Thus, in particular when the pinion 36 is restricted from rotating in the pull-out direction, pull-out direction rotation and radial direction tilting of the second linking column 32 with respect to the second linking hole 38 can be effectively limited, enabling the torsion shaft 28 to be still more effectively retained by the pinion 36.

Moreover, the assisting faces 38C are formed to the right side portions of the side faces on the pull-out direction sides of the press-fit holes 38A. The assisting faces 38C greatly enlarge the dimension of the press-fit holes 38A along the circumferential direction of the second linking hole 38 at the right side portions of the press-fit holes 38A, thereby assisting the press-fitting of the press-fit portions 32A into the press-fit holes 38A. This enables the press-fitting of the press-fit portions 32A into the press-fit holes 38A to be facilitated.

Moreover, the assisting faces 38C are formed to the side faces on the pull-out direction sides of the press-fit holes 38A. This enables the angle of inclination of the assisting faces 38C with respect to the left faces of the press-fit portions 32A to be reduced when the press-fit portions 32A are being press-fit into the press-fit holes 38A, thereby enabling the carved faces 38D to be formed predominantly to the side faces on the pull-out direction sides of the press-fit holes 38A by the left faces of the press-fit portions 32A. This enables the carved faces 38D to be effectively formed to the side faces on the pull-out direction sides of the press-fit holes 38A.

Moreover, in the spool 14, the anchor hole 18A-side face of the base end side portion of the bearing portion 20 is formed by the side face on the leading end side of the anchor hole 18A, the inner hole 14A-side face of the base end side portion of the bearing portion 20 is in the same plane as the peripheral face of the pull-out direction side portion of the insertion hole 16A of the first linking hole 16, and the corner faces 16B on the pull-out direction sides of the insertion holes 16A have more gently curving concave profiles than the corner faces on the take-up direction sides of the insertion holes 16A. Thus, even though the anchor hole 18A-side face of the base end side portion of the bearing portion 20 (the side face at the leading end side of the anchor hole 18A) curves in a concave profile, by configuring the inner hole 14A-side face of the base end side portion of the bearing portion 20 with gently curving concave face profile, a reduction in a thickness dimension (a dimension L in FIG. 6B) of the base end side portion of the bearing portion 20 can be suppressed, thereby enabling a reduction in the strength of the base end side portion of the bearing portion 20 to be suppressed. Damage to the base end side portion of the bearing portion 20 can accordingly be suppressed, even when pull-out force acts on the webbing 22 from the spool 14, and load from the anchor loop 22A of the webbing 22 and the shaft 24 acts on the leading end side portion of the bearing portion 20 (the side face at the leading end side of the anchor hole 18A).

Furthermore, the side faces on the take-up direction sides of the insertion holes 16A have substantially planar profiles, and have smaller angles of inclination with respect to the radial direction of the first linking hole 16 than the side faces on the pull-out direction side of the insertion holes 16A. Thus, when the pinion 36 is restricted from rotating in the pull-out direction, pull-out direction rotational force of the spool 14 can be effectively applied to the insertion portions 30A of the first linking column 30 of the torsion shaft 28 from the side faces on the take-up direction sides of the insertion holes 16A, and the transmission strength of this rotational force from the side faces on the take-up direction sides of the insertion holes 16A to the insertion portions 30A can be increased.

Note that the carved faces 38D are formed to the peripheral faces of the press-fit holes 38A in the pinion 36 in the present exemplary embodiment. However, it suffices that the carved faces 38D are formed to peripheral faces of at least one of the press-fit holes 38A in the pinion 36 or the press-fit portions 32A of the torsion shaft 28.

Furthermore, in the present exemplary embodiment, the entire axial direction range of the second linking column 32 (including the press-fit portions 32A) of the torsion shaft 28 is press-fit into the second linking hole 38 (including the press-fit holes 38A) of the pinion 36. However, the second linking column 32 (including the press-fit portions 32A) of the torsion shaft 28 may be press-fit into the second linking hole 38 (including the press-fit holes 38A) of the pinion 36 so as to span the entire axial direction range of the second linking hole 38.

Moreover, in the present exemplary embodiment, the first linking hole 16 (including the insertion holes 16A) of the spool 14 may be modified to the configuration of the second linking hole 38 (including the press-fit holes 38A) of the pinion 36, and the first linking column 30 (including the insertion portions 30A) of the torsion shaft 28 may be modified to the configuration of the second linking column 32 (including the press-fit portions 32A) of the torsion shaft 28. In such cases, the take-up direction sides and the pull-out direction sides of the press-fit holes 38A in the spool 14 may be reversed, and the take-up direction sides and the pull-out direction sides of the press-fit portions 32A on the spool 14-side of the torsion shaft 28 may also be reversed.

Furthermore, in the present exemplary embodiment, the first linking hole 16 (including the insertion holes 16A) is provided in the spool 14, and the first linking column 30 (including the insertion portions 30A) is provided to the torsion shaft 28. However, the first linking column 30 (including the insertion portions 30A) may be provided to the spool 14, and the first linking hole 16 (including the insertion holes 16A) may be provided in the torsion shaft 28.

Moreover, in the present exemplary embodiment, the second linking column 32 (including the press-fit portions 32A) is provided to the torsion shaft 28 and the second linking hole 38 (including the press-fit holes 38A) is provided in the pinion 36. However, the second linking hole 38 (including the press-fit holes 38A) may be provided in the torsion shaft 28 and the second linking column 32 (including the press-fit portions 32A) may be provided to the pinion 36.

Furthermore, in the present exemplary embodiment, the spool 14 and the torsion shaft 28 are configured as separate bodies, and the torsion shaft 28 and the pinion 36 are configured as separate bodies. However, the spool 14 and the torsion shaft 28 may be linked together to form an integral unit, or the torsion shaft 28 and the pinion 36 may be linked together to form an integral unit.

Moreover, in the present exemplary embodiment, the pinion 36 and the lock base 40 are configured as separate bodies. However, the pinion 36 and the lock base 40 may be configured as an integral unit.

The entire content of the disclosure of Japanese Patent Application No. 2018-25790 filed on Feb. 16, 2018 is incorporated by reference in the present specification.

EXPLANATION OF THE REFERENCE NUMERALS

10 webbing take-up device
14 spool (rotation body)
22 webbing
28 torsion shaft (linking body)
32A press-fit portion
36 pinion (restricting body)
38A press-fit hole
38C assisting face (assisting portion)
38D carved face (carved location)
40 lock base (restricting body)

The invention claimed is:
1. A webbing take-up device comprising:
a rotation body that is rotated in a pull-out direction when webbing for fitting over an occupant is pulled out;

a linking body that is linked to the rotation body so as to be capable of rotating integrally with the rotation body;

a restricting body that is linked to the linking body so as to be capable of rotating integrally with the linking body, and that is restricted from rotating in the pull-out direction at a predetermined occasion; and a press-fit portion that is provided at one of the linking body or either the rotation body or the restricting body, that is press-fit into a press-fit hole provided at another of the linking body or either the rotation body or the restricting body so as to link the linking body and either the rotation body or the restricting body together, and that is configured such that an interference force between the press-fit portion and the press-fit hole increases on progression along a press-fit direction into the press-fit hole, further comprising an assisting portion configured to assist the press-fitting of the press-fit portion into the press-fit hole.

2. The webbing take-up device of claim 1, wherein the assisting portion is inclined with respect to a peripheral face of the press-fit hole or the press-fit portion adjacent to the assisting portion.

3. The webbing take-up device of claim 1, wherein a peripheral face of at least one of the press-fit hole or the press-fit portion is inclined with respect to the press-fit direction of the press-fit portion into the press-fit hole.

4. The webbing take-up device of claim 1, wherein: an angle of inclination at a contact portion between a peripheral face of the press-fit hole and a peripheral face of the press-fit portion with respect to a rotation-radial direction is configured to be smaller on a side where rotational force of the rotation body is applied when the restricting body is restricted from rotating in the pull-out direction than on an opposite side from the side where rotational force of the rotation body is applied when the restricting body is restricted from rotating in the pull-out direction.

5. A webbing take-up device comprising:

a rotation body that is rotated in a pull-out direction when webbing for fitting over an occupant is pulled out;

a linking body that is linked to the rotation body so as to be capable of rotating integrally with the rotation body;

a restricting body that is linked to the linking body so as to be capable of rotating integrally with the linking body, and that is restricted from rotating in the pull-out direction at a predetermined occasion;

a press-fit portion that is provided at one of the linking body or either the rotation body or the restricting body, and that is press-fit into a press-fit hole provided at another of the linking body or either the rotation body or the restricting body so as to link the linking body and either the rotation body or the restricting body together; and a carved location that is provided at a peripheral face of at least one of the press-fit hole or the press-fit portion, that is disposed on a side where rotational force of the rotation body is applied when the restricting body is restricted from rotating in the pull-out direction, and that is formed by press-fitting the press-fit portion into the press-fit hole.

6. A webbing take-up device comprising:

a rotation body that is rotated in a pull-out direction when webbing for fitting over an occupant is pulled out;

a linking body that is linked to the rotation body so as to be capable of rotating integrally with the rotation body;

a restricting body that is linked to the linking body so as to be capable of rotating integrally with the linking body, and that is restricted from rotating in the pull-out direction at a predetermined occasion; and a press-fit portion that is provided at one of the linking body or either the rotation body or the restricting body, and that is press-fit into a press-fit hole provided at another of the linking body or either the rotation body or the restricting body over an entire rotation-axial direction range of the press-fit hole or is press-fit into the press-fit hole over an entire rotation-axial direction range of the press-fit portion so as to link the linking body and either the rotation body or the restricting body together, further comprising an assisting portion configured to assist the press-fitting of the press-fit portion into the press-fit hole.

* * * * *